United States Patent
Yamato et al.

(10) Patent No.: US 10,084,215 B2
(45) Date of Patent: Sep. 25, 2018

(54) BATTERY PACK

(71) Applicant: Murata Manufacturing Co., Ltd., Nagaokakyo-shi, Kyoto (JP)

(72) Inventors: Ryoji Yamato, Nagaokakyo (JP); Naoki Fujii, Nagaokakyo (JP); Gaku Kamitani, Nagaokakyo (JP); Midori Sunaga, Nagaokakyo (JP); Toshinari Tabata, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 9 days.

(21) Appl. No.: 15/353,987

(22) Filed: Nov. 17, 2016

(65) Prior Publication Data
US 2017/0149102 A1 May 25, 2017

Related U.S. Application Data

(63) Continuation of application No. PCT/JP2015/064678, filed on May 22, 2015.

(30) Foreign Application Priority Data

Jun. 4, 2014 (JP) .................. 2014-115373

(51) Int. Cl.
*H01M 10/48* (2006.01)
*H01M 10/0525* (2010.01)
(Continued)

(52) U.S. Cl.
CPC ..... *H01M 10/482* (2013.01); *H01M 10/0525* (2013.01); *H02J 7/34* (2013.01); *H02P 4/00* (2013.01)

(58) Field of Classification Search
CPC ............ H01M 10/482; H02J 7/34; H02P 4/00
See application file for complete search history.

(56) References Cited

U.S. PATENT DOCUMENTS 7,573,234 B1 * 8/2009 Tsukamoto ......... H01M 10/441
320/116
2004/0201365 A1 10/2004 Dasgupta et al.
(Continued)

FOREIGN PATENT DOCUMENTS

JP 2007-274832 A 10/2007
JP 2011-254698 A 12/2011
(Continued)

OTHER PUBLICATIONS

International Search Report issued for PCT/JP2105/064678, dated Aug. 4, 2015.
(Continued)

*Primary Examiner* — Muhammad S Islam
(74) *Attorney, Agent, or Firm* — Arent Fox LLP

(57) ABSTRACT

A first cell string provided in a first battery module has a larger allowable current value than a plurality of cell strings provided in second and third battery modules. The battery module is provided with a current limiting circuit that limits the charge and discharge currents of the second cell string. When the current value detected by a current sensor is zero, the switch is turned off. In this condition, when the terminal voltage value of the third cell string is different from the terminal voltage value of the second cell string, a second switch switches the connection between the second and third battery modules in order to interpose the current limiting circuit between the second and third cell strings.

20 Claims, 9 Drawing Sheets

(51) Int. Cl.
*H02P 4/00* (2006.01)
*H02J 7/34* (2006.01)

(56) References Cited

U.S. PATENT DOCUMENTS

| | | | | |
|---|---|---|---|---|
| 2007/0188148 A1* | 8/2007 | Kawasumi | ............... | H01M 2/34 |
| | | | | 320/134 |
| 2009/0295334 A1* | 12/2009 | Yang | .................... | H02J 7/0031 |
| | | | | 320/134 |
| 2012/0293112 A1* | 11/2012 | Suzuki | ................ | H01M 10/482 |
| | | | | 320/107 |
| 2014/0009105 A1* | 1/2014 | Keates | ................ | H01M 10/425 |
| | | | | 320/103 |

FOREIGN PATENT DOCUMENTS

| | | |
|---|---|---|
| JP | 2012-234700 A | 11/2012 |
| JP | 2012-234898 A | 11/2012 |

OTHER PUBLICATIONS

Witten Opinion of the International Searching Authority issued for PCT/JP2015/064676, dated Aug. 4, 2015.

* cited by examiner

BATTERY PACK

CROSS REFERENCE TO RELATED APPLICATIONS

The present application is a continuation of International application No. PCT/JP2015/064678, filed May 22, 2015, which priority to Japanese Patent Application No. 2014-115373, filed Jun. 4, 2014, the entire contents of each of which are incorporated herein by reference.

TECHNICAL FIELD

The present invention relates to a battery pack that includes a single battery cell or multiple battery cells connected in series (hereinafter, referred to as "cell strings") and has a lithium ion battery adopted as a battery cell, and more particularly, a battery pack that includes a configuration in which multiple cell strings are connected in parallel.

BACKGROUND ART

The voltage generated by a single battery cell is determined by active materials constituting the cell and is typically a low value on the order of no more than several volts. For this reason, multiple battery cells are typically used to form a battery pack.

In addition, for technical reasons such as the difficulty of manufacturing high-ampacity battery cells, safety and economic reasons when there is a need for high-ampacity battery packs, multiple cell strings are connected in parallel in the battery pack.

Japanese Patent Application Laid-Open No. 2012-234700 discloses an example of the prior art where multiple cell strings or the like are connected in parallel in battery packs.

In battery packs including a configuration in which multiple cell strings are connected in parallel, there is a need to ensure the potentials of the respective cell strings exactly the same. Otherwise, there will be risks such as ignition, due to current flowing in without any limitation from the cell strings or the like at potentials to the cell strings at low potentials. However, in order for the potentials of relatively high-capacity cell strings or the like that have an ampacity of several Ah or more to be made coincident, specifically, there is a need for work to connect the cell strings or the like in parallel with resistors interposed therebetween and leaving the cell strings or the like for a long period of time, thereby increasing the manufacturing cost of the battery packs.

In addition, each of the cell strings has to have substantially the same electrical characteristics. Originally, unless the charge voltage and discharge voltage of the cell strings or the like are coincident, it is obviously impossible to connect the cell strings or the like in parallel, and cell strings or the like have necessarily to be used which have the same type and the same number of battery cells connected in series.

Moreover, if some cell strings having a high internal resistance are connected in parallel with other cell strings that have a low internal resistance in a battery pack, an imbalance will be caused with the result that more charge and discharge currents flow through the strings that have a low internal resistance, and the ampacity of the battery pack as a whole has to be thus set to a value that is significantly lower than the total of the ampacities of the cell strings constituting the battery pack.

For these reasons, it is not only impossible to use different types of cell strings in mixture, but also it is not preferable to use new strings together with cell strings as used items. This is because the performance of the cell strings is degraded by over time. Preferably, battery cells that are used for the cell strings have to be obtained by selecting battery cells that have close electrical characteristics from the same manufacturing lot.

As just described, the increased manufacturing cost of battery packs, the difficulty with maintenance when some cell strings have broken down, the difficulty with the use of used batteries are problems in the manufacture of battery packs that have multiple cell strings or the like connected in parallel. In addition, when new cell strings are to be added to multiple cell strings or the multiple cell strings are to be replaced by new cell strings, it is anticipated that simply connecting the cell strings in parallel to each other may result in problems such as abnormal overheating due to rapid current flowing as a function of the magnitudes of the voltages between the cell strings.

Therefore, a main object of the present invention is to provide a battery pack which can increase the productivity and operability of the battery pack in which multiple secondary batteries (storage battery) exhibiting different characteristics from each other are housed.

BRIEF SUMMARY OF THE INVENTION

A battery pack (10: reference numeral as used in Examples, the same applies hereinafter) in accordance with the present invention is a battery pack including: a first battery module (MD1) including a first storage battery (ST1) that shows a first allowable current value, the first battery module being connected to a load (LD1) that changes dynamically in an amount of load; a second battery module (MD2) including a second storage battery (ST2) that shows a second allowable current value smaller than the first allowable current value, and a limiting circuit (14) that limits charge and discharge currents of the second storage battery, the second battery module being connected in parallel to the first battery module; and a third battery module (MD3a) including a third storage battery (ST3a) that shows a third allowable current value equal to the second allowable current value and that is connected in parallel to the second storage battery, the battery pack including a terminating circuit (SW1) that terminates the parallel connection between the first battery module and the second battery module in a specific state, and a first switching circuit (SW2a) that switches a connected state between the second battery module and the third battery module in order to interpose the limiting circuit between the second storage battery and the third storage battery in conjunction with operation of the terminating circuit.

Preferably, the load includes a motor (24) that generates a regenerative energy.

Preferably, the specific state is a state in which an input/output current to the second battery module has a value representing zero.

Preferably, the first switching circuit interposes the limiting circuit between the second storage battery and the third storage battery in a first specific period in which the third storage battery has a terminal voltage value different from that of the second storage battery, and the terminating circuit establishes a parallel connection between the first battery module and the second battery module after the first specific period.

Preferably, the first switching circuit is provided in the third battery module.

Preferably, the battery pack further includes: a fourth battery module (MD3b) including a fourth storage battery (ST3b) that shows a fourth allowable current value equal to the second allowable current value and that is connected in parallel to the second storage battery; a second switching circuit (SW2b) that switches a connected state between the second battery module and the fourth battery module in order to interpose the limiting circuit between the second storage battery and the fourth storage battery in conjunction with operation of the terminating circuit; and an activation control circuit (S11 to S13) that activates the second switching circuit after placing the connected state, which has been switched by the first switching circuit, back in place.

In an aspect, the second switching circuit interposes the limiting circuit between the second storage battery and the fourth storage battery in a second specific period in which the fourth storage battery has a terminal voltage value different from that of the second storage battery, and the terminating circuit establishes a parallel connection between the first battery module and the second battery module after the second specific period.

In another aspect, the second switching circuit is provided in the fourth battery module.

Preferably, the limiting circuit includes a switching element (TR1, TR2) that connects or disconnects a power supply line (LN21, LN22) through which the charge and discharge currents are applied, and a rectifier circuit (14rc) that rectifies the charge and discharge currents.

Further preferably, the rectifier circuit includes the inductor (L1) provided on the power supply line, and the switching element includes a first transistor (TR1) provided on the power supply line at one end of the inductor, and a second transistor (TR2) provided on the power supply line at the other end of the inductor.

When the load is increased, the large current discharged from the first storage battery is supplied to the load, and the small current discharged from the second storage battery and the third storage battery and limited by the limiting circuit is supplied to the load. However, because the ampacity of the first storage battery is low, the large current discharged from the first storage battery is almost depleted before the load is stabilized. After the load is stabilized, the load is driven by the small current discharged from the second storage battery and the third storage battery.

When regenerative energy is generated from the load, a current based on the regenerative energy is supplied to the first storage battery, the second storage battery, and the third storage battery. The current limited by the limiting circuit is distributed to the second storage battery and the third storage battery, and the other current is distributed to the first storage battery. The first storage battery, the second storage battery, and the third storage battery are charged in this way. When the regenerative energy is depleted, the current discharged from the first storage battery is supplied to the second storage battery and the third storage battery through the limiting circuit. The second storage battery and the third storage battery are charged in this way.

Based on the foregoing, in the specific state, the parallel connection between the first battery module and the second battery module is terminated, thereby causing the limiting circuit to be interposed between the second storage battery and the third storage battery. The charging and discharging between the second storage battery and the third storage battery are executed through the limiting circuit, and finally, the terminal voltage value of the two batteries are coincident with each other. Therefore, dangers such as ignition are avoided, and the battery pack in which multiple secondary batteries (storage batteries) exhibiting different characteristics from each other are housed thus has productivity improved. In addition, depending on the intended use of a user, safe handling can be achieved in the case of wishing to add a battery module because of a capacity shortage in battery capacity prepared normally, or in the case of wishing to replace a battery module deteriorated.

The foregoing object, other objects, features, and advantages of the present invention will be further evident from the following detailed descriptions of examples with reference to the drawings.

BRIEF EXPLANATION OF DRAWINGS

FIG. 3(A) is an equivalent circuit diagram illustrating a circuit configuration obtained when the terminal voltage of a cell string ST2 is different from the terminal voltage of a cell string ST3a.

FIG. 3(B) is an equivalent circuit diagram illustrating a circuit configuration obtained when the terminal voltage of the cell string ST2 is coincident with the terminal voltage of the cell string ST3a.

FIG. 10(A) is an equivalent circuit diagram illustrating a circuit configuration obtained when the terminal voltage of a cell string ST2 is different from the terminal voltage of a cell string ST3a.

DESCRIPTION OF THE PREFERRED EMBODIMENTS

Figure 1:
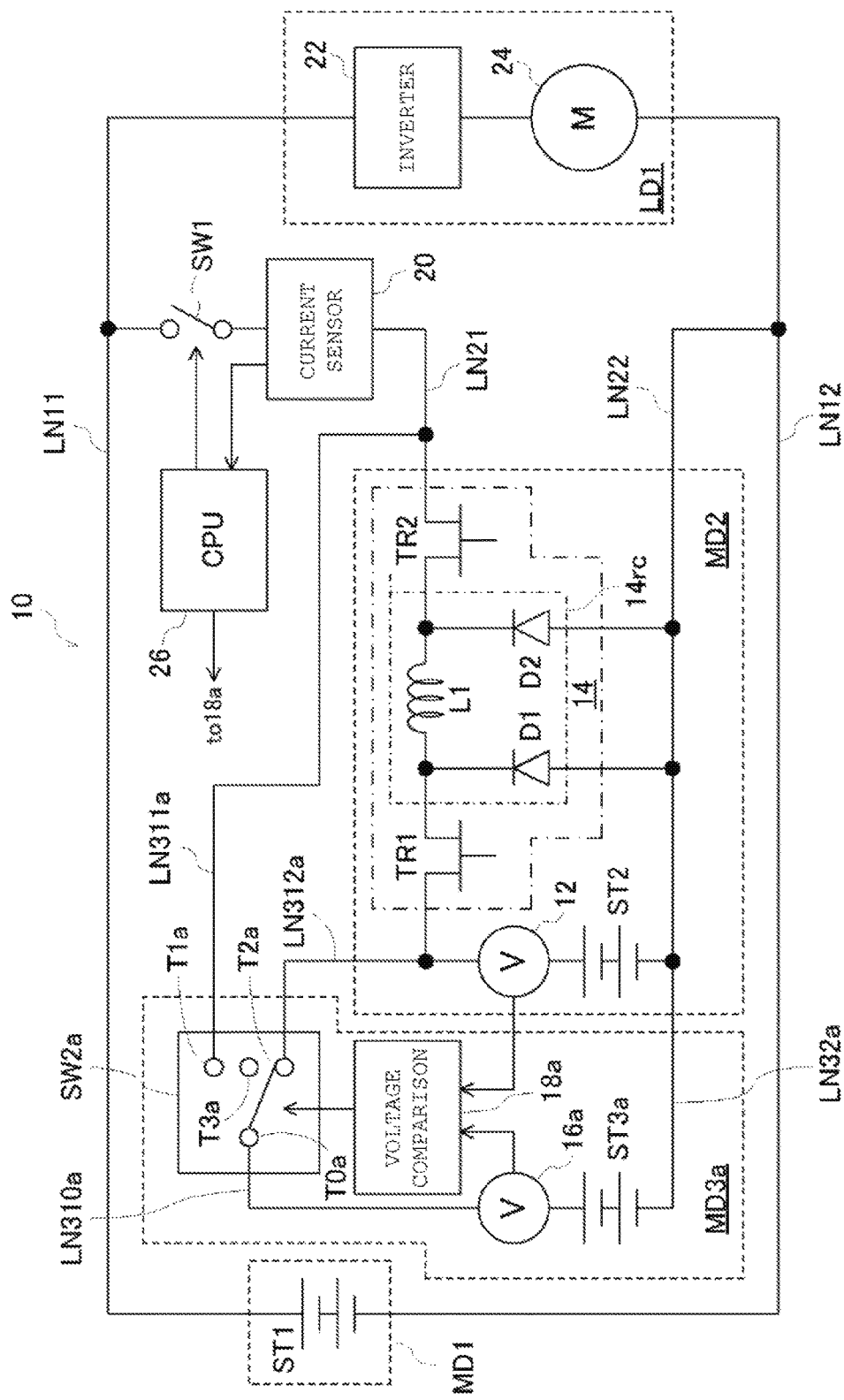
FIG. 1 is a circuit diagram illustrating the configuration of a battery pack according to one embodiment of the invention.

Referring to FIG. 1, a battery pack 10 according to one embodiment of the present invention includes three battery modules MD1, MD2, and MD3a. The battery module MD1 has a cell string ST1. The battery module MD2 has a cell string ST2, a voltage detecting circuit 12, and a current limiting circuit 14. The battery module MD3a has a cell string ST3a, a voltage detecting circuit 16a, a voltage comparing circuit 18a and a switch SW2a.

The cell strings ST1, ST2, and ST3a are each formed by a plurality of battery cells connected in series. In addition, the battery cells are all secondary batteries (storage batteries) such as lithium ion batteries.

However, the output of each battery cell that forms the cell string ST1 is higher than the output of each battery cell that forms the cell strings ST2 and ST3a, and the capacity of each battery cell that forms the cell string ST1 is lower than the capacity of each battery cell that forms the cell strings ST2 and ST3a. In addition, the output and capacity of each battery cell that forms the cell string ST2 are the same as the output and capacity of each battery cell that forms the cell string ST3a.

Accordingly, the cell string ST1 is a high-output battery, whereas the cell string ST2 and ST3a are each a high-capacity battery.

Figure 2:
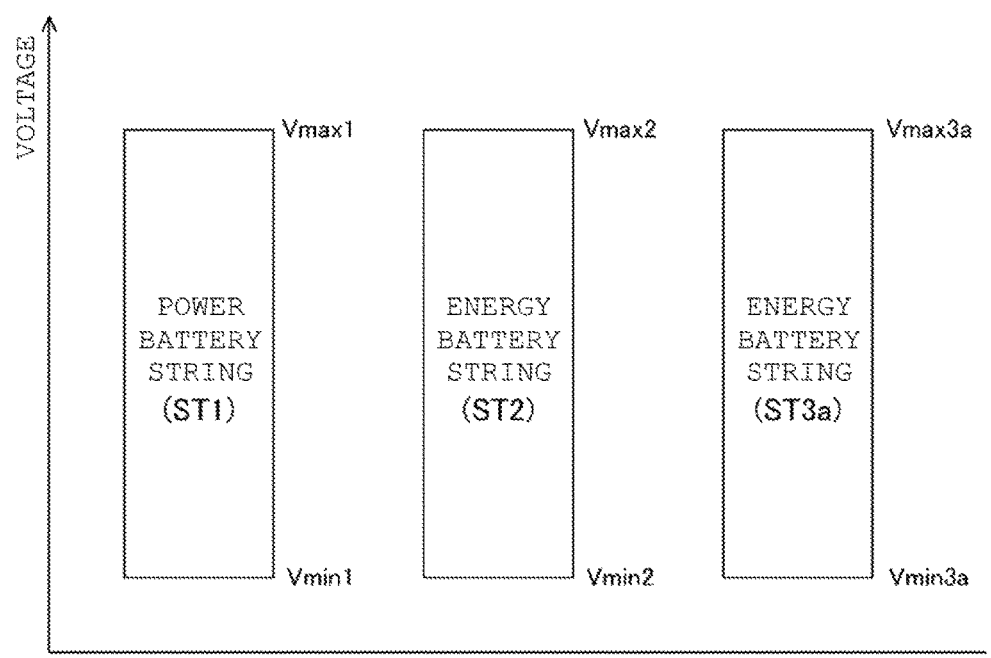
FIG. 2 is an schematic diagram showing an example of characteristics of cell strings provided in the battery pack shown in FIG. 1.

As shown in FIG. 2, open voltage characteristics in a steady state are coincident among the cell strings ST1, ST2, and ST3a. More specifically, when the maximum value and minimum value of the open voltage of the cell string ST1 are respectively designated as "Vmax1" and "Vmin1", the maximum value and minimum value of the open voltage of the cell string ST2 are respectively designated as "Vmax2" and "Vmin2", and the maximum value and minimum value of the open voltage of the cell string ST3a are respectively designated as "Vmax3a" and "Vmin3a", the maximum values Vmax1, Vmax2, and Vmax3a are coincident with each other (i.e. are the same), and the minimum values Vmin1, Vmin2, and Vmin3a are also coincident with each other.

It is to be noted that a single battery cell may be provided in place of the cell string ST1 in the battery module MD1, a single battery cell may be provided in place of the cell string ST2 in the battery module MD2, and a single battery cell may be provided in place of the cell string ST3a in the battery module MD3a. The battery modules MD2 and MD3a are preferably removably mounted with a connector (not shown) in the battery pack 10. Thus, through an external power supply, the cell strings ST2 and ST3a can be charged in a simple manner, or the amount of energy (ampacity) in the battery pack 10 can be adjusted depending on the intended use.

Returning to FIG. 1, the cell string ST1 has a positive terminal connected to positive-side terminal of a load LD1 through a power supply line LN11, and the cell string ST1 has a negative terminal connected to a negative-side terminal of the load LD1 through a power supply line LN12.

In addition, the cell string ST2 has a positive terminal connected to the power supply line LN11 through a power supply line LN21, and the cell string ST2 has a negative terminal connected to the power supply line LN12 through a power supply line LN22. However, the power supply line LN21 is provided with: the voltage detecting circuit 12; and a transistor TR1, an inductor L1, and a transistor TR2 constituting the current limiting circuit 14, a current sensor 20; and a switch SW1.

The voltage detecting circuit 12 detects the terminal voltage value of the cell string ST2. The current limiting circuit 14 (which includes diodes D1 and D2, transistors TR1, TR2 and the inductor L1) configured as follows.

The transistors TR1 and Tr2 are both MOS-type field-effect transistors. The transistor TR1 has a drain connected to the voltage detecting circuit 12, the transistor TR1 has a source connected to one end of the inductor L1, and the transistor TR1 has a gate connected to a first a pulse generator, not shown. The transistor TR2 has a drain connected to the other end of the inductor L1, the transistor TR2 has a source connected to the current sensor 20, and the transistor TR2 has a gate connected to another second pulse generator, not shown.

The diode D1 has a cathode connected to one end of the inductor L1, and the diode D1 has an anode connected to the power supply line LN22. The diode D2 has a cathode connected to the other end of the inductor L1, and the diode D2 has an anode connected to the power supply line LN22.

The transistor TR1 is turned on when a pulse output from the first pulse generator indicates an H (high) level, and is turned off when a pulse output from the first pulse generator indicates a L (low) level. Likewise, the transistor TR2 is turned on when a pulse output from the second pulse generator indicates a H level and is turned off when a pulse output from the second pulse generator indicates a L level.

The cell string ST3a has a positive terminal connected to the power supply line LN21 through power supply lines LN310a, LN311a, and LN312a, and the cell string ST3a has a negative terminal connected to the power supply line LN22 through a power supply line LN32a.

More particularly, the voltage detecting circuit 16a that detects the terminal voltage value of the cell string ST3a is provided on the power supply line LN310a. The cell string ST3a has a positive terminal connected to a common terminal T0a of the switch SW2a through the voltage detecting circuit 16a.

The power supply line LN311a has one end connected to a switching terminal T1a of the switch SW2a and the other end connected to the source of the transistor TR2. In addition, the power supply line LN312a has one end connected to a switching terminal T2a of the switch SW2a and the other end connected to the drain of the transistor TR1.

The voltage comparing circuit 18a compares the terminal voltage value of the cell string ST3a, detected by the voltage detecting circuit 16a, with the terminal voltage value of the cell string ST2, detected by the voltage detecting circuit 12, and switches the setting of the switch SW2a depending on the comparison result. The switch SW2a selects the switching terminal T1a when the terminal voltage value of the cell string ST3a is different from the terminal voltage value of the cell string ST2, and selects the switching terminal T2a when the terminal voltage value of the cell string ST3a is coincident with the terminal voltage value of the cell string ST2. It is to be noted that when the voltage comparing circuit 18a is turned off, the switch SW2a selects a floating terminal T3a.

The load LD1 is formed by an inverter 22 and a motor 24. The inverter 22 has one end connected to the positive-side terminal of the load LD1 and the other end connected to one end of the motor 24. The motor 24 has the other end connected to the negative-side terminal of the load LD1.

The current sensor 20 detects a current value that is applied through the power supply line LN21 and provides the detected current value to a CPU 26. When the provided current value indicates "0", the CPU 26 turns off the switch SW1 and turns on the voltage comparing circuit 18a.

When the terminal voltage value of the cell string ST3a is different from the terminal voltage value of the cell string ST2, the voltage comparing circuit 18a connects the switch SW2a to the switching terminal T1a. As a result, the connected condition shown in FIG. 3(A) in which the current limiting circuit 14 is interposed between the cell string ST2 and ST3a.

In this condition, when the terminal voltage value of the cell string ST2 is higher than the terminal voltage value of the cell string ST3a, the transistor TR2 is continuously turned on, and the transistor TR1 is repeatedly turned on and off. As a result, the cell string ST3a is charged by the cell string ST2.

Specifically, the discharge current from the cell string ST2 is supplied to the cell string ST3a through the inductor L1 and the transistor TR2 when the transistor TR1 is turned on. When the supplied current value is excessively high, the transistor TR1 is turned off, thereby stopping the discharge from the cell string ST2.

However, the actions of the inductor L1 and diode D1 continue the current supply to the cell string ST3a. When the weaken action of the inductor L1 reduces the supply current value, the transistor TR1 is turned on again. As a result of repeating the foregoing operation, the cell string ST3a is charged by the cell string ST2.

Figure 3A:
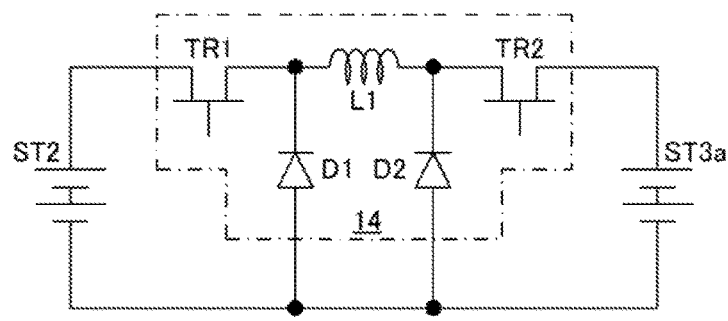

On the other hand, in the connected state shown in FIG. 3(A), when the terminal voltage value of the cell string ST3a is higher than the terminal voltage value of the cell string ST2, the transistor TR1 is continuously turned on and the transistor TR2 is repeatedly turned on and off. As a result, the cell string ST2 is charged by the cell string ST3a.

Specifically, the discharge current from the cell string ST3a is supplied to the cell string ST2 through the inductor L1 and the transistor TR1 when the transistor TR2 is turned on. When the supplied current value is excessively high, the transistor TR2 is turned off thereby stopping the discharge from the cell string ST3a.

However, the actions of the inductor L1 and diode D2 continue the current supply to the cell string ST2. When the weaken action of the inductor L1 reduces the supply current value, the transistor TR2 is turned on again. As a result of repeating the foregoing operation, the cell string ST2 is charged by the cell string ST3a.

Figure 3B:
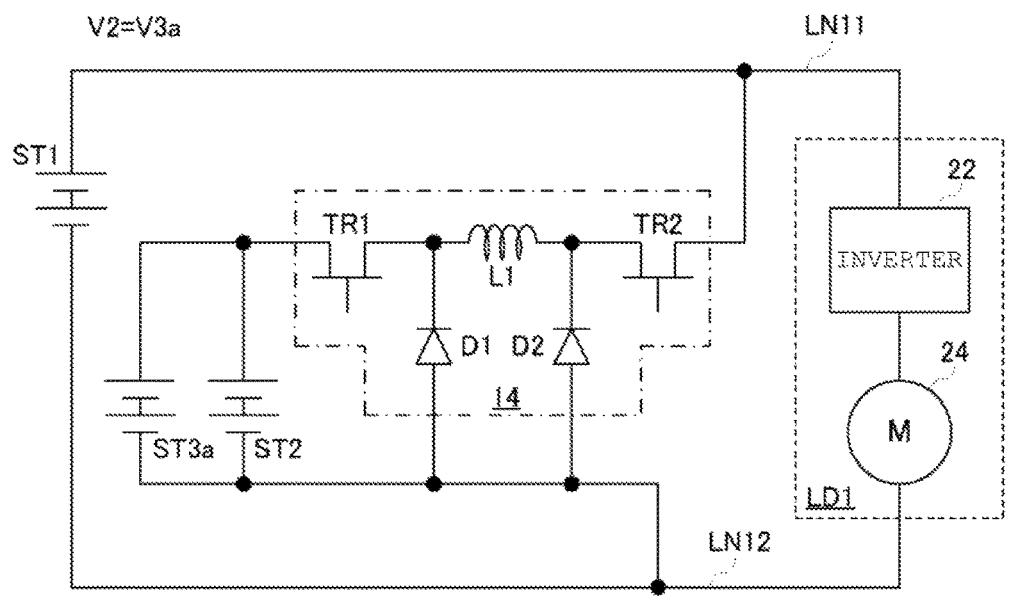

When the terminal voltage value of the cell string ST3a is coincident with the terminal voltage value of the cell string ST2, the switch SW2a is connected to the switching terminal T2a by the voltage comparing circuit 18a and the switch SW1 is turned on by the CPU 26. As a result, the connected condition shown in FIG. 3(B) is established.

In this condition, the cell string ST3a is connected in parallel with the cell string ST2. The discharge currents from the cell strings ST2 and ST3a are supplied to the power supply lines LN11 and LN12 through the current limiting circuit 14 which operates in the manner described above. In addition, the charge currents from the power supply lines LN11 and LN12 are also supplied to the cell strings ST2 and ST3a through the current limiting circuit 14 which operates are described above.

The cell string ST1 serves as a high-output assembled battery, whereas the cell strings ST2 and ST3a serve as high-capacity assembled batteries. In other words, the cell string ST1 exhibits the characteristics of large allowable current value and small ampacity, whereas the cell strings ST2 and ST3a exhibit the characteristics of small allowable current values and large ampacities.

Therefore, when the load LD1 is temporarily increased, thereby creating a need to output a large current temporarily from the battery pack 10, the output current is mostly covered by the cell string ST1. When the load LD1 is stabilized at a low level, thus allowing the output current from the battery pack 10 to be suppressed steadily, the output current is mostly provided by the cell strings ST2 and ST3a.

This means that regardless of the variation in load LD1, the output currents from the battery modules MD2 and MD3a can be limited to a predetermined value or less. For this reason, the battery module MD2 is provided with the current limiting circuit 14.

In addition, when regenerative energy is generated from the load LD1, a current based on the regenerative energy charges the cell strings ST1, ST2, and ST3a. Therefore, the next large-current discharge is allowed after a while.

As described above, there is a tradeoff relationship between the low ampacity in the cell string ST1 with a large allowable current value and the high current ampacities in the cell strings ST2 and ST3a inversely with small allowable current values, and the adoption of such a configuration as this example achieves a balance between large-current discharge (power performance) for a short period of time and small-current discharge (energy performance) for a long period of time.

Figure 4:
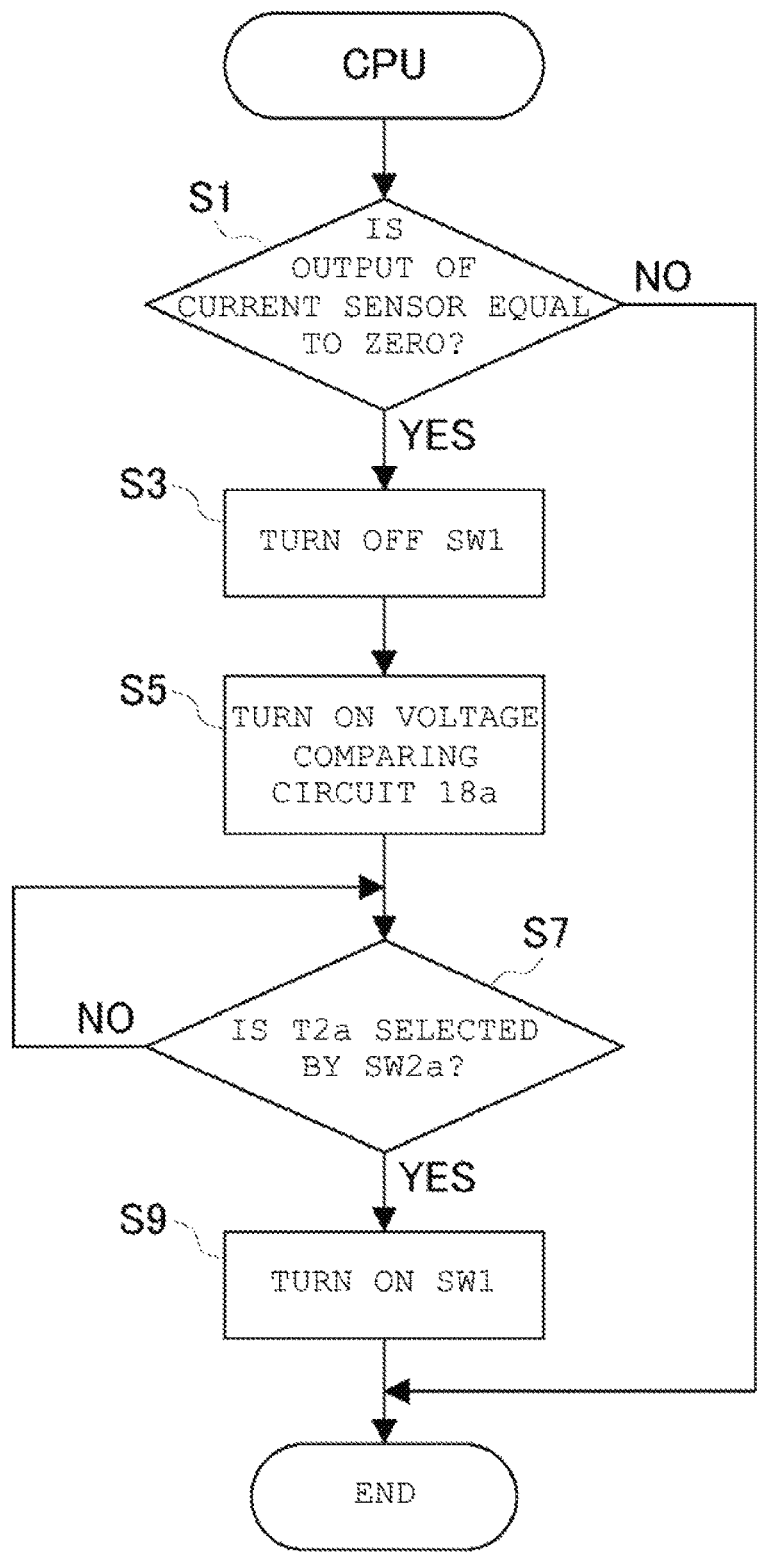
FIG. 4 is a flow diagram showing an example of operation of a CPU provided in the battery pack shown in FIG. 1.
Figure 5:
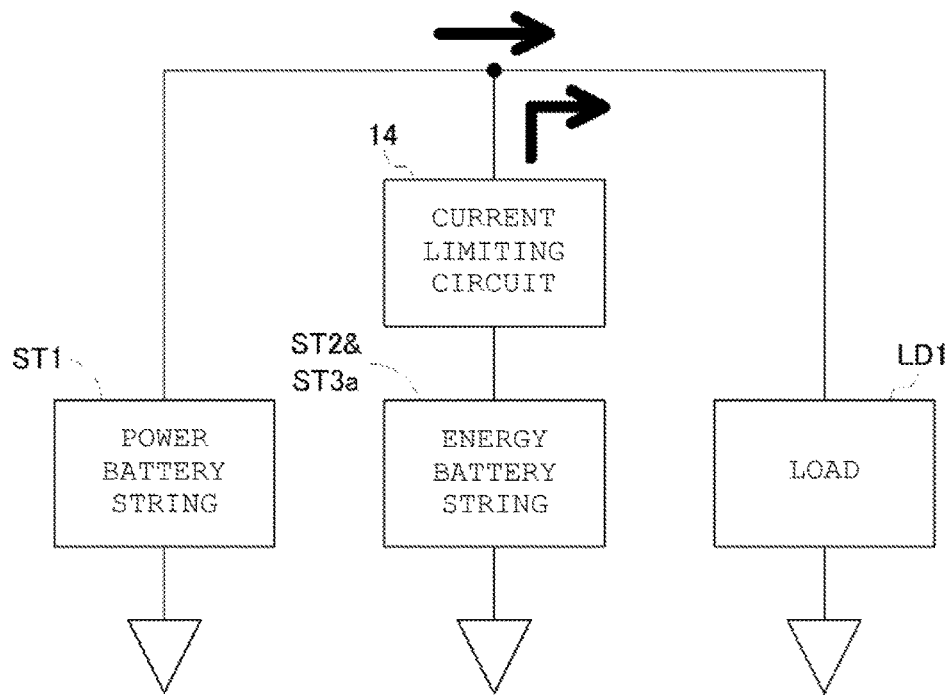
FIG. 5 is an schematic diagram showing a part of operation of the battery pack shown in FIG. 1.
Figure 6:
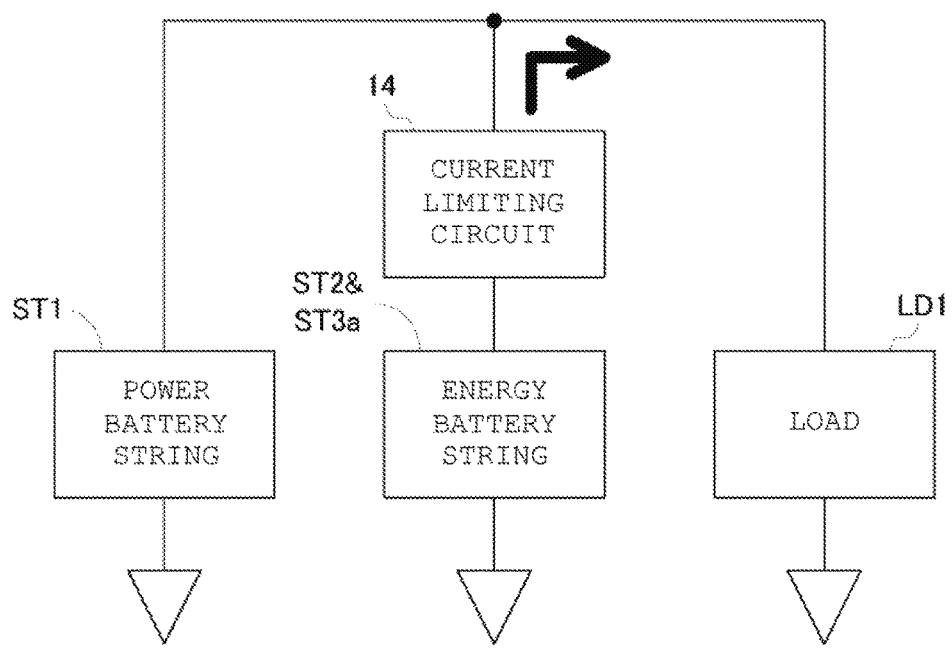
FIG. 6 is an schematic diagram showing another part of the operation of the battery pack shown in FIG. 1.
Figure 7:
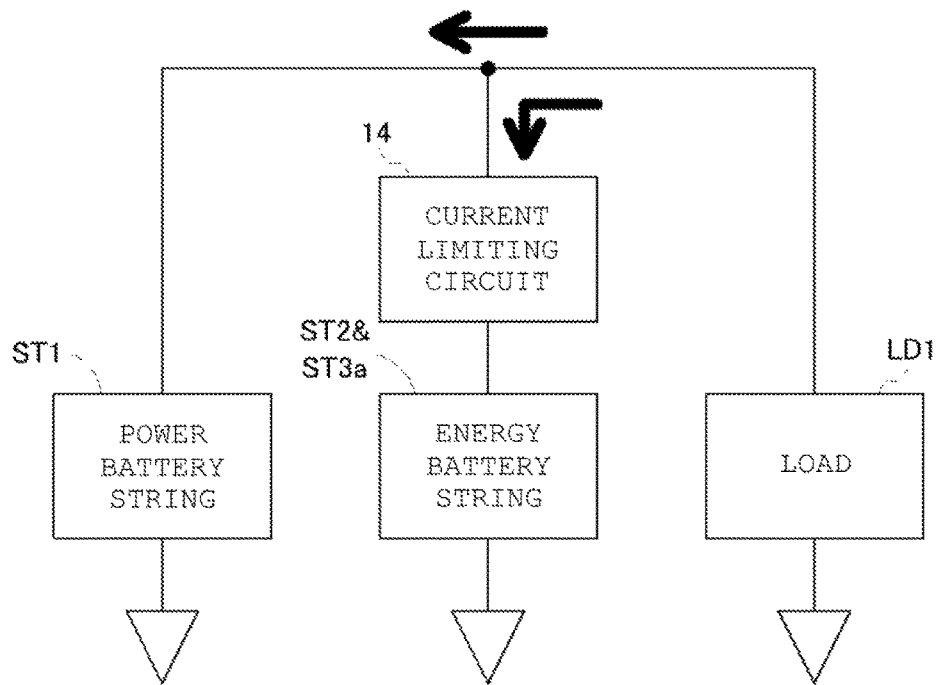
FIG. 7 is an schematic diagram showing another part of the operation of the battery pack shown in FIG. 1.
Figure 8:
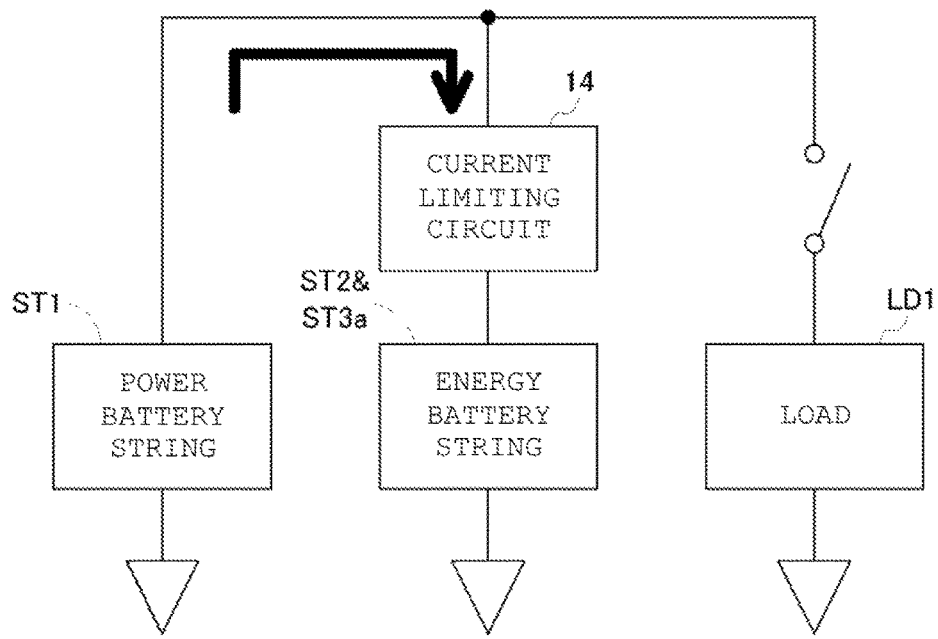
FIG. 8 is an schematic diagram showing yet another part of the operation of the battery pack shown in FIG. 1.

Processing executed by the CPU 26 for the transition from the circuit configuration shown in FIG. 3(A) to the circuit configuration shown in FIG. 3(B) will be described with reference to FIG. 4. It is to be noted that this processing is executed periodically.

In a step S1, whether the current value detected by the current sensor 20 represents zero or not is determined, and the processing is ended if the determination result is NO, whereas the processing proceeds to a step S3 if the determination result is YES. In the step S3, the switch SW1 is turned off, and in a step S5, the voltage comparing circuit 18a is turned on. In a step S7, whether the switch SW2a selects the switching terminal T2a or not (whether the connected condition shown in FIG. 3(B) is established or not) is determined repeatedly. When the determination result is updated from NO to YES, the switch SW1 is turned on in step S9, and thereafter, the processing is ended.

The relationships between the magnitude of the load LD1 and the flows of the charge and discharge currents will be described in more detail with reference to FIGS. 5 to 8. As a premise, the amount of the load LD1 is increased which period of time when the motor 24 starts to rotate, and stabilized at a low level when the rotation speed of the motor 24 is stabilized. In addition, the cell string ST1 serves as a high-output assembled battery, whereas the cell strings ST2 and ST3a serve as high-capacity assembled batteries.

When the motor 24 begins rotating, the transistor TR1 is repeatedly turned on and off, and the transistor TR2 is continuously turned on. As a result, a large current discharged from the cell string ST1 is supplied to the load LD1, and a small current discharged from the cell strings ST2 and ST3a (suppressed by the current limiting circuit 14) is supplied to the load LD1 (see FIG. 5).

However, because the ampacity of the cell string ST1 is low, the large current discharged from the cell string ST1 is almost depleted before the rotation speed of the motor 24 is stabilized. After the rotation speed of the motor 24 is stabilized, the motor 24 is driven by the small current discharged from the cell strings ST2 and ST3a (see FIG. 6).

When the motor 24 tries to be stopped, regenerative energy is generated from the motor 24. In this case, the transistor TR1 is continuously turned on, the transistor TR2 is repeatedly turned on and off, and a current based on the regenerative energy is supplied to the cell strings ST1, ST2, and ST3a. The current limited by the current limiting circuit 14 is supplied to the cell strings ST2 and ST3a, and the current not limited by the current limiting circuit 14 is supplied to the cell string ST1. The cell strings ST1, ST2, and ST3a are charged in this way (see FIG. 7).

The condition in which the transistor TR1 is continuously turned on and the transistor TR2 is repeatedly turned on and off is also maintained after the motor 24 is completely stopped. The current discharged from the cell string ST1 is supplied to the cell strings ST2 and ST3a through the current limiting circuit 14, thereby charging the cell strings ST2 and ST3a (see FIG. 8).

As can be seen from the foregoing description, the battery module MD1 includes the cell string ST1 that shows a larger allowable current value, which is connected to the load LD1 that changes dynamically in the amount of load. The battery module MD2 including the cell string ST2 that exhibits a smaller allowable current value, and the current limiting circuit 14 that limits the charge and discharge currents of the string, which is connected in parallel to the battery module MD1. The battery module MD3a has the cell string ST3a that exhibits an allowable current value equal to the allowable current value of the cell string ST2. The cell string ST3a is connected in parallel with the cell string ST2 in a steady state.

The switch SW1 is turned off when the current value detected by the current sensor 20 is zero. This terminates the parallel connection between the battery modules MD1 and MD2. In this state, when the terminal voltage value of the cell string ST3a is different from the terminal voltage value of the cell string ST2, the switch SW2a switches the connection between the battery modules MD2 and MD3a, in order to interpose the current limiting circuit 14 between the cell strings ST2 and ST3a.

The charging and discharging between cell strings ST2 and ST3a are executed through the current limiting circuit 14, and finally, the terminal voltage value of the two strings are coincident with each other. Therefore, dangers such as ignition are avoided, and the productivity of the battery pack 10 is thus improved.

Figure 9:
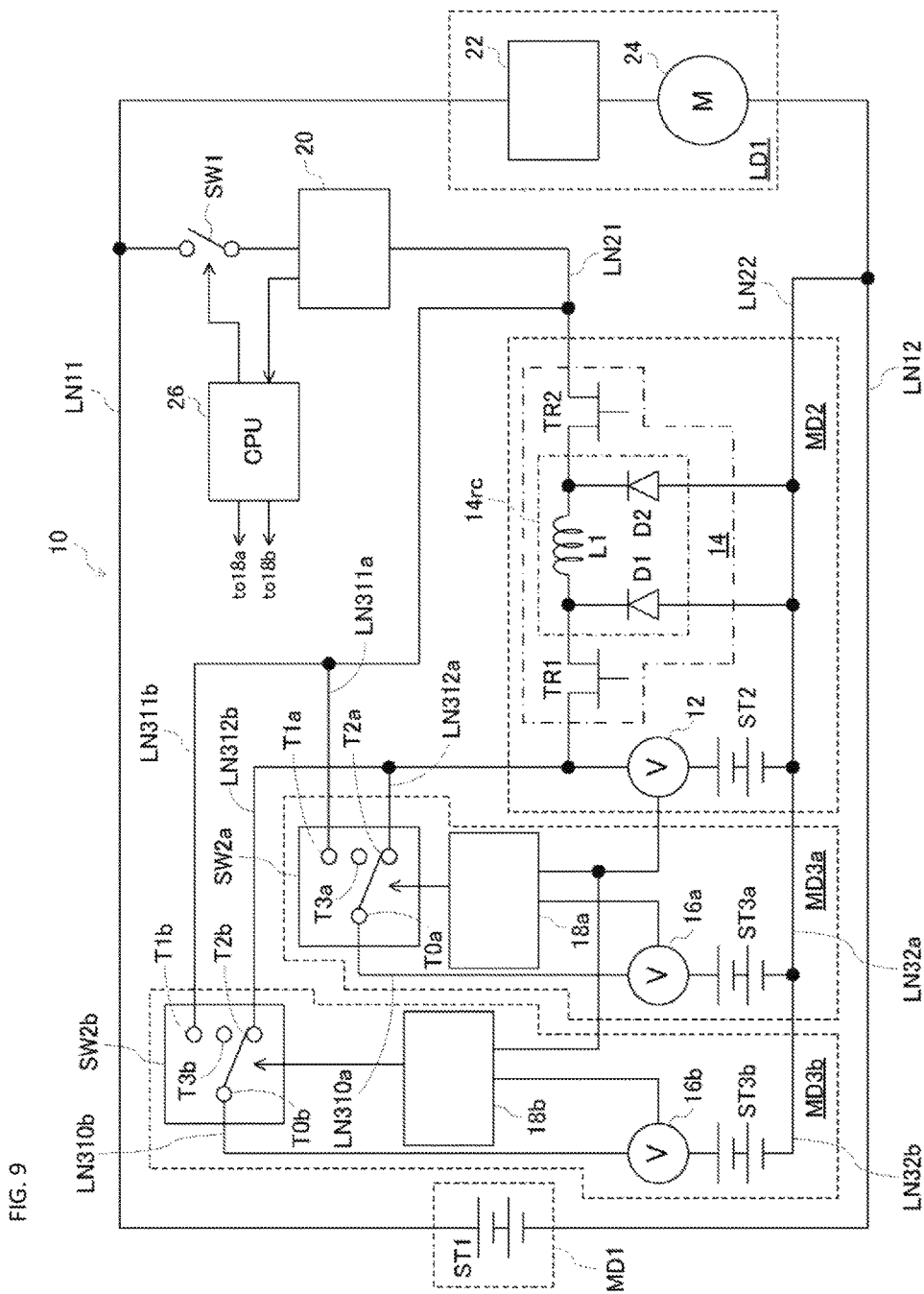
FIG. 9 is a circuit diagram illustrating the configuration of a battery pack according to a second embodiment of the invention.

It is to be noted that this example is adapted to connect the single high-capacity battery module MD2 in parallel with the high-output battery module MD1. However, a plurality of high-capacity battery modules may be adapted to be connected in parallel to the high-output battery module MD1, and furthermore, the high-capacity battery modules may be adapted to be individually removable. In this case, the battery pack 10 is configured as shown in FIG. 9. The battery pack 10 shown in FIG. 9 has almost the same configuration as the battery pack 10 shown in FIG. 1, and the explanation of the same configuration will thus not be repeated.

The battery module MD3b has a cell string ST3b, a voltage detecting circuit 16b, voltage comparing circuit 18b, and a switch SW2b. The cell string ST3b is formed by a plurality of battery cells connected in series. Each battery cell is a secondary battery (storage battery) such as a lithium ion battery, and the output and capacity of the cell is coincident with (equal to) the output and capacity of each battery cell that forms the cell string ST3a. Therefore, the cell string ST3b makes a high-capacity assembled battery, similar to the cell string ST3a.

The cell string ST3b has a positive terminal connected to a power supply line LN21 through power supply lines LN310b, LN311b, and LN312b, and the cell string ST3b has a negative terminal connected to a power supply line LN22 through a power supply line LN32b.

The voltage detecting circuit 16b that detects the terminal voltage value of the cell string ST3b is provided on the power supply line LN310b. The cell string ST3b has a positive terminal connected to a common terminal T0b of the switch SW2b through the voltage detecting circuit 16b.

The power supply line LN311b has one end connected to a switching terminal T1b of the switch SW2b and the other end connected to a source of a transistor TR2. In addition, the power supply line LN312b has one end connected to a switching terminal T2b of the switch SW2b and the other end connected to a drain of a transistor TR1.

The voltage comparing circuit 18b compares the terminal voltage value of the cell string ST3b (detected by the voltage detecting circuit 16b) with the terminal voltage value of a cell string ST2 (detected by a voltage detecting circuit 12) and switches the setting of the switch SW2b depending on the comparison result. The switch SW2b selects the switching terminal T1b when the terminal voltage value of the cell string ST3b is different from the terminal voltage value of the cell string ST2 and selects the switching terminal T2b when the terminal voltage value of the cell string ST3b is equal to the terminal voltage value of the cell string ST2. When the voltage comparing circuit 18b is turned off, the switch SW2b selects a floating terminal T3b.

As with the battery pack 10 shown in FIG. 1, when the terminal voltage value of the cell string ST3a is different from the terminal voltage value of the cell string ST2, the voltage comparing circuit 18a connects the switch SW2a to the switching terminal T1a. As a result, the connected condition shown in FIG. 10(A), wherein the current limiting circuits 14 interposed between the cell string ST2 and ST3a, is established.

In this condition, when the terminal voltage value of the cell string ST2 is higher than the terminal voltage value of the cell string ST3a, the transistor TR2 is continuously turned on and the transistor TR1 is repeatedly turned on and off. As a result, the cell string ST3a is charged by the cell string ST2. On the other hand, when the terminal voltage value of the cell string ST3a is higher than the terminal voltage value of the cell string ST2, the transistor TR1 is continuously turned on, and the transistor TR2 is repeatedly turned on and off. As a result, the cell string ST2 is charged by the cell string ST3a.

When the terminal voltage value of the cell string ST3a is equal to the terminal voltage value of the cell string ST2, the voltage comparing circuit 18a is turned off and the voltage comparing circuit 18b is turned on. The switch SW2a selects the floating terminal T3a in response to the voltage comparing circuit 18a being turned off.

When the terminal voltage value of the cell string ST3b is different from the terminal voltage value of the cell string ST2, the voltage comparing circuit 18b connects the switch SW2b to the switching terminal T1b. As a result, the connected condition shown in FIG. 10(B) with the current limiting circuits 14 interposed between the cell string ST2 and ST3b.

In this condition, when the terminal voltage value of the cell string ST2 is higher than the terminal voltage value of the cell string ST3b, the transistor TR2 is continuously turned on and the transistor TR1 is repeatedly turned on and off. As a result, the cell string ST3b is charged by the cell string ST2. On the other hand, when the terminal voltage value of the cell string ST3b is higher than the terminal voltage value of the cell string ST2, the transistor TR1 is continuously turned on and the transistor TR2 is repeatedly turned on and off. As a result, the cell string ST2 is charged by the cell string ST3b.

Figure 10A:
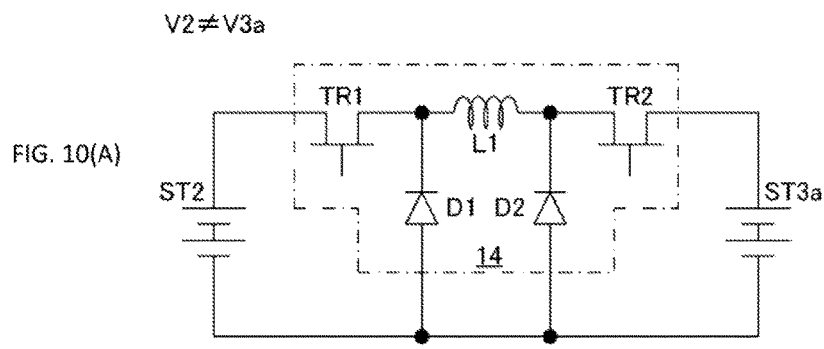
Figure 10B:
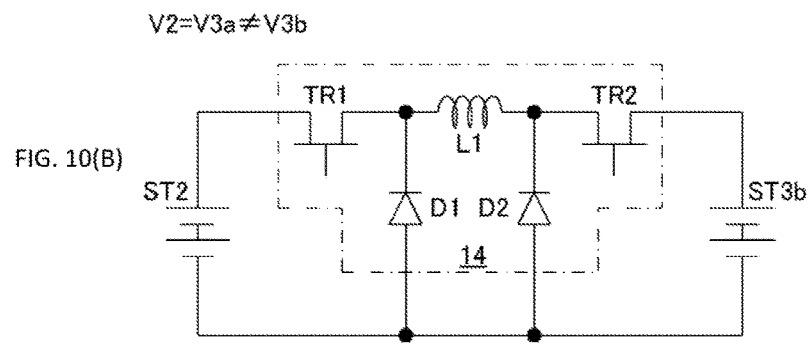
FIG. 10(B) is an equivalent circuit diagram illustrating a circuit configuration obtained when the terminal voltage of the cell string ST2 is coincident with the terminal voltage of the cell string ST3a, and different from the terminal voltage of a cell string ST3b.
Figure 10C:
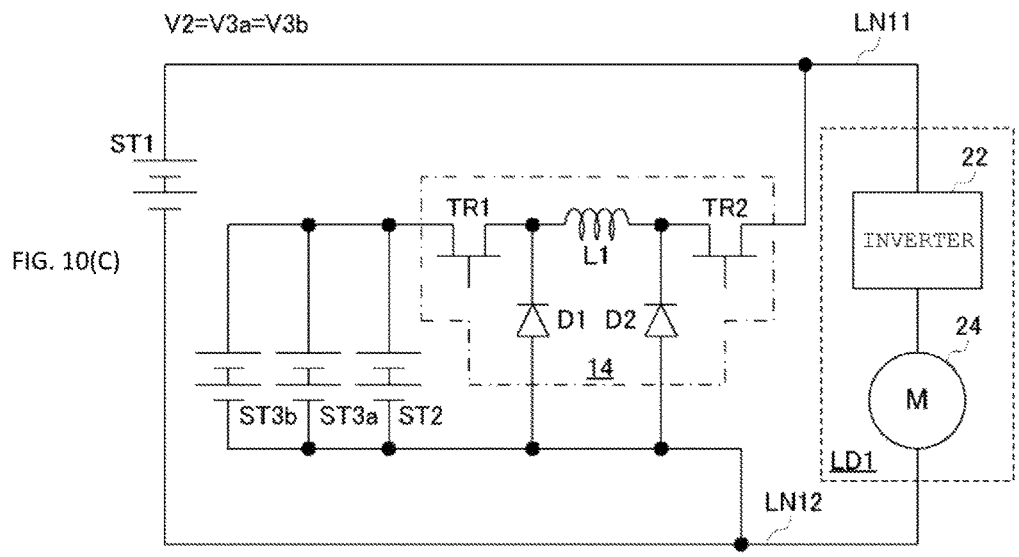
FIG. 10(C) is an equivalent circuit diagram illustrating a circuit configuration obtained when the terminal voltage of the cell string ST2 is coincident with each of the terminal voltages of the cell string ST3a and cell string ST3b.

When the terminal voltage value of the cell string ST3b is coincident with the terminal voltage value of the cell string ST2, the switch SW2b is connected to the switching terminal T2b by the voltage comparing circuit 18b. Furthermore, the voltage comparing circuit 18a and the switch SW1 are turned on by a CPU 26. As a result, the connected condition shown in FIG. 10(C) is established.

In this condition, the cell strings ST3*a* and ST3*b* are connected in parallel with the cell string ST2. The discharge currents from the cell strings S2, ST3*a*, and ST3*b* are supplied to the power supply lines LN11 and LN12 through the current limiting circuit 14 which operates in the manner described above. In addition, the charge currents from the power supply lines LN11 and LN12 are also supplied to the cell strings S2, ST3*a*, and ST3*b* through the current limiting circuit 14 which operates in the manner described above.

Figure 11:
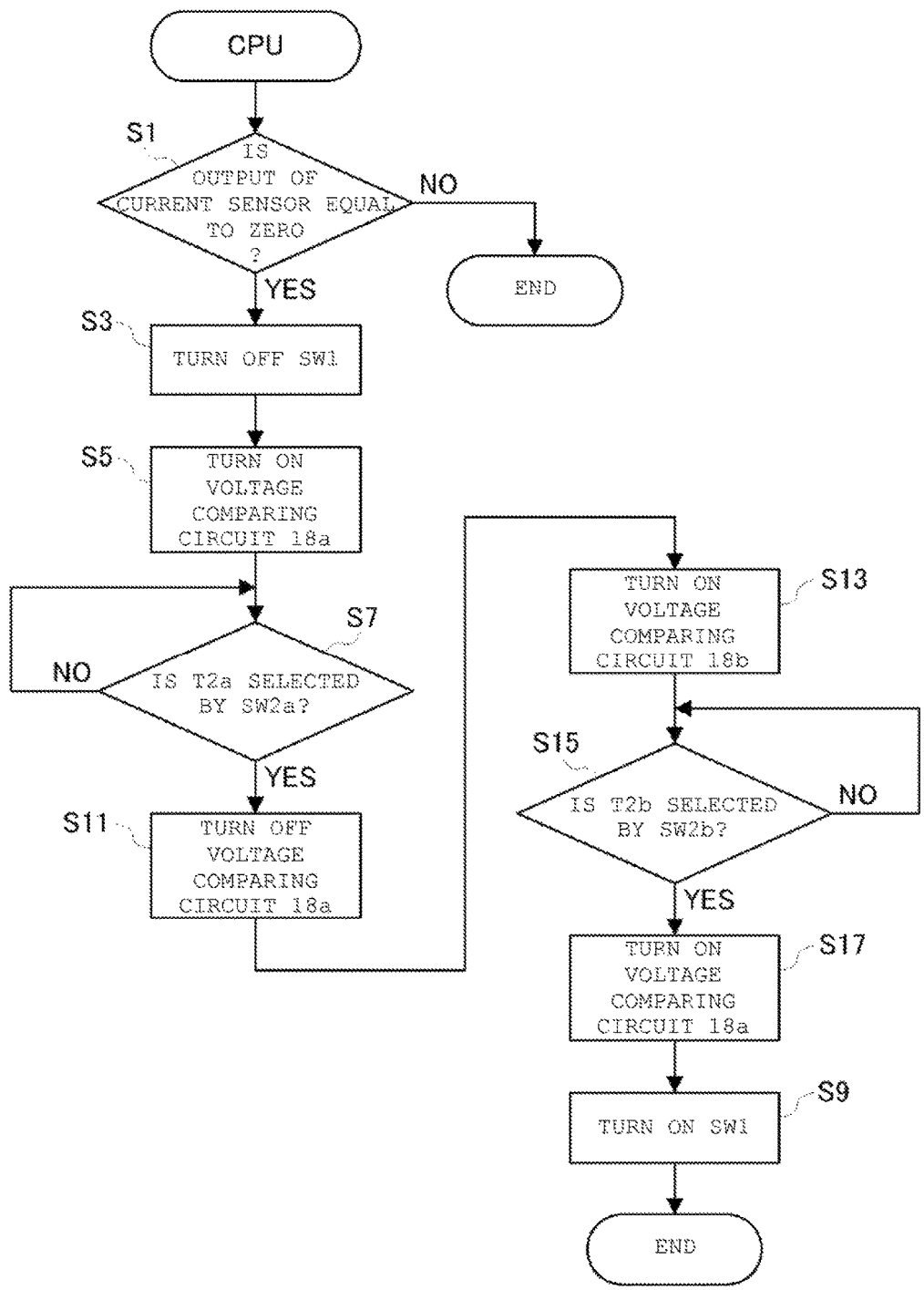
FIG. 11 is a flow diagram showing an example of operation of a CPU provided in the battery pack shown in FIG. 9.

Processing executed by the CPU 26 for the transition of the circuit configuration among FIG. 10(A) through 10(C) will be described with reference to FIG. 11. However, this processing is also almost the same as the processing shown in FIG. 4, and the explanation of the same processing will thus not be repeated.

When the processing in a step S7 is completed, the voltage comparing circuit 18*a* is turned off (step S1), and the voltage comparing circuit 18*b* is turned (step S13). Whether the switch SW2*b* selects the switching terminal T2*b* or not is determined repeatedly in a step S15. When the determination result is updated from NO to YES, the voltage comparing circuit 18*a* is turned on (step S17) and the processing thereafter proceeds the step S9.

Also in this example, the charging and discharging among the cell strings ST2, ST3*a*, and ST3*b* are executed through the current limiting circuit 14, and finally, the terminal voltage value of the three strings are coincident with each other. Therefore, dangers such as ignition are avoided, and the productivity of the battery pack 10 is thus improved.

It is to be noted that while the number of cell strings connected in parallel to the cell string ST2 is two in this example, three or more cell strings may be adapted to be connected in parallel to the cell string. In this case, the order of selecting the cell string to be compared with the cell string ST2 in terms of terminal voltage may be a descending order according to voltage value, or an ascending order according to voltage value.

The invention claimed is:

1. A battery pack, comprising:
a first battery module including a first storage battery that has a first allowable current value, the first battery module being connected to a load whose load value changes dynamically;
a second battery module including a second storage battery that has a second allowable current value that is smaller than the first allowable current value and a current limiting circuit that limits charge and discharge currents of the second storage battery, the second battery module being connected in parallel to the first battery module;
a third battery module including a third storage battery that has a third allowable current value equal to the second allowable current value and that is connected in parallel to the second storage battery;
a terminating circuit that terminates the parallel connection between the first battery module and the second battery module in a specific state of at least one of an input current and an output current of the second battery module; and
a first switching circuit that interposes the current limiting circuit between the second storage battery and the third storage battery in conjunction with the operation of the terminating circuit so that one of the second or third storage battery with a higher output voltage charges the other of the second or third storage battery with a lower output voltage.

2. The battery pack according to claim 1, wherein the load comprises a motor that generates a regenerative energy.

3. The battery pack according to claim 1, wherein the specific state is a state in which an input/output current of the second battery module has a value representing zero.

4. The battery pack according to claim 1, wherein:
the first switching circuit interposes the current limiting circuit between the second and third battery modules when the third storage battery has a terminal voltage value which is different from a terminal voltage of the second storage battery; and
the terminating circuit establishes a parallel connection between the first battery module and the second battery module after the first switching circuit interposes the current limiting circuit between the second and third battery modules.

5. The battery pack according to claim 1, wherein the first switching circuit is provided in the third battery module.

6. A battery pack, comprising:
a first battery module including a first storage battery that has a first allowable current value, the first battery module being connected to a load whose load value changes dynamically;
a second battery module including a second storage battery that has second allowable current value that is smaller than the first allowable current value and a current limiting circuit that limits charge and discharge currents of the second storage battery, the second battery module being connected in parallel to the first battery module;
a third battery module including a third storage battery that has a third allowable current value equal to the second allowable current value and that is connected in parallel to the second storage battery;
a terminating circuit that terminates the parallel connection between the first battery module and the second battery module in a specific state;
a first switching circuit that interposes the current limiting circuit between the second storage battery and the third storage battery in conjunction with the operation of the terminating circuit;
a fourth battery module including a fourth storage battery that has a fourth allowable current value equal to the second allowable current value and that is connected in parallel to the second storage battery;
a second switching circuit that interposes the limiting circuit between the second and fourth battery modules in conjunction with operation of the terminating circuit; and
an activation control circuit that activates the second switching circuit after controlling the first switching circuit such that the current limiting circuit is not interposed between the second and third battery modules.

7. The battery pack according to claim 6, wherein:
the second switching circuit interposes the current limiting circuit between the second and fourth storage batteries when the fourth storage battery has a terminal voltage value which is different from a terminal voltage value of the second storage battery, and
the terminating circuit establishes a parallel connection between the first battery module and the second battery module after the second switching circuit interposes the current limiting circuit between the second and fourth storage batteries.

8. The battery pack according to claim 6, wherein the second switching circuit is provided in the fourth battery module.

9. The battery pack according to claim 1, wherein the current limiting circuit comprises:
a switch that interposes the current limiting circuit between the second storage battery and the third storage battery so that one of the second or third storage battery with a higher output voltage charges the other of the second or third storage battery with a lower output voltage; and
a rectifier circuit that rectifies the charge and discharge currents.

10. The battery pack according to claim 9,
wherein the rectifier circuit includes an inductor provided on the power supply line; and
wherein first and second transistors are provided on opposite ends of the inductor.

11. The battery pack of claim 1, wherein at least one of the storage batteries is a cell string.

12. The battery pack of claim 1, wherein each of the storage batteries comprises a respective cell string.

13. A battery pack, comprising:
a first battery module including a first storage battery having a rated voltage output, the first battery module being connected to a load whose load value changes dynamically;
a second battery module including a second storage battery having the rated voltage output and a current limiting circuit that limits charge and discharge currents of the second storage battery;
a third battery module including a third storage battery having the rated voltage output;
a control circuit that:
(a) when the voltage outputs of the second and third storage batteries are equal, places the outputs of the second and third battery modules in parallel with each other and in parallel with the output of the first battery module so that the outputs of the first, second and third battery modules are applied to the load; and
(b) when the voltage outputs of the second and third storage modules are not equal to each other, removes the outputs of the second and third battery modules from the load and interposes the current limiting circuit between the second and third storage batteries so that one of the second or third storage battery with a higher output voltage charges the other of the second or third storage battery with a lower output voltage.

14. The battery pack of claim 13, wherein at least one of the battery modules comprises a cell string.

15. The battery pack of claim 13, wherein each of the battery modules comprises a respective cell string.

16. The battery pack of claim 13, wherein the first, second and third storage batteries each have a respective capacity and the respective capacities of the second and third storage batteries are larger than the respective capacity of the first storage battery.

17. The battery pack of claim 16, wherein the first storage battery has a higher allowable current value than the second and third storage batteries.

18. The battery pack of claim 13, further comprising:
a fourth battery module including a fourth storage battery that has a fourth allowable current value equal to the second allowable current value and that is connected in parallel to the second storage battery;
a second switching circuit that interposes the limiting circuit between the second and fourth battery module in conjunction with operation of the terminating circuit; and
an activation control circuit that activates the second switching circuit after controlling the first switching circuit such that the current limiting circuit is not interposed between the second and third battery modules.

19. The battery pack according to claim 18, wherein:
the second switching circuit interposes the current limiting circuit between the second and fourth storage batteries during a second period in which the fourth storage battery has a terminal voltage value which is different from that of the second storage battery; and
the terminating circuit establishes a parallel connection between the first battery module and the second battery module after the completion of the second period.

20. The battery pack according to claim 18, wherein the second switching circuit is provided in the fourth battery module.

* * * * *